United States Patent [19]

Staples

[11] 3,851,280

[45] Nov. 26, 1974

[54] NON-LINEAR SIGNAL PROCESSING DEVICE USING SQUARE LAW DETECTION OF SURFACE ELASTIC WAVES WITH INSULATED GATE FIELD EFFECT TRANSISTOR

[75] Inventor: Edward Jerome Staples, Garland, Tex.

[73] Assignee: Texas Instruments Incorporated, Dallas, Tex.

[22] Filed: Aug. 1, 1973

[21] Appl. No.: 384,855

[52] U.S. Cl..................... 333/30 R, 333/72, 357/23, 357/26, 357/41

[51] Int. Cl........ H03h 9/26, H03h 9/30, H01l 19/00

[58] Field of Search......... 333/30 R, 72; 317/235 G; 325/442, 451; 310/9.7, 9.8

[56] References Cited

UNITED STATES PATENTS

| | | | |
|---|---|---|---|
| 3,479,572 | 11/1969 | Pokorny | 317/235 R |
| 3,691,406 | 9/1972 | Mize | 307/308 |
| 3,749,984 | 7/1973 | Benyon, Jr. et al. | 317/235 G |
| 3,770,949 | 11/1973 | Whitehouse et al. | 333/30 R X |

OTHER PUBLICATIONS

Luukkala–"Convolution and Time Inversion Using Parametric Interactions of Acoustic Surface Waves" in Applied Physics Letters, Vol. 18, No. 9, 1 May 1971; pages 393–394.

*Primary Examiner*—James W. Lawrence
*Assistant Examiner*—Marvin Nussbaum
*Attorney, Agent, or Firm*—Harold Levine; James T. Comfort; William E. Hiller

[57] ABSTRACT

Disclosed is a new structure and method for the non-linear mixing of signals with a surface wave delay line. An insulated gate field effect transistor is located on the surface of the surface wave delay line and mixing is accomplished by making use of the square law dependence of channel current on gate voltage. The square law dependence is a first order non-linear relationship and gives rise to efficient mixing.

4 Claims, 1 Drawing Figure

PATENTED NOV 26 1974 3,851,280
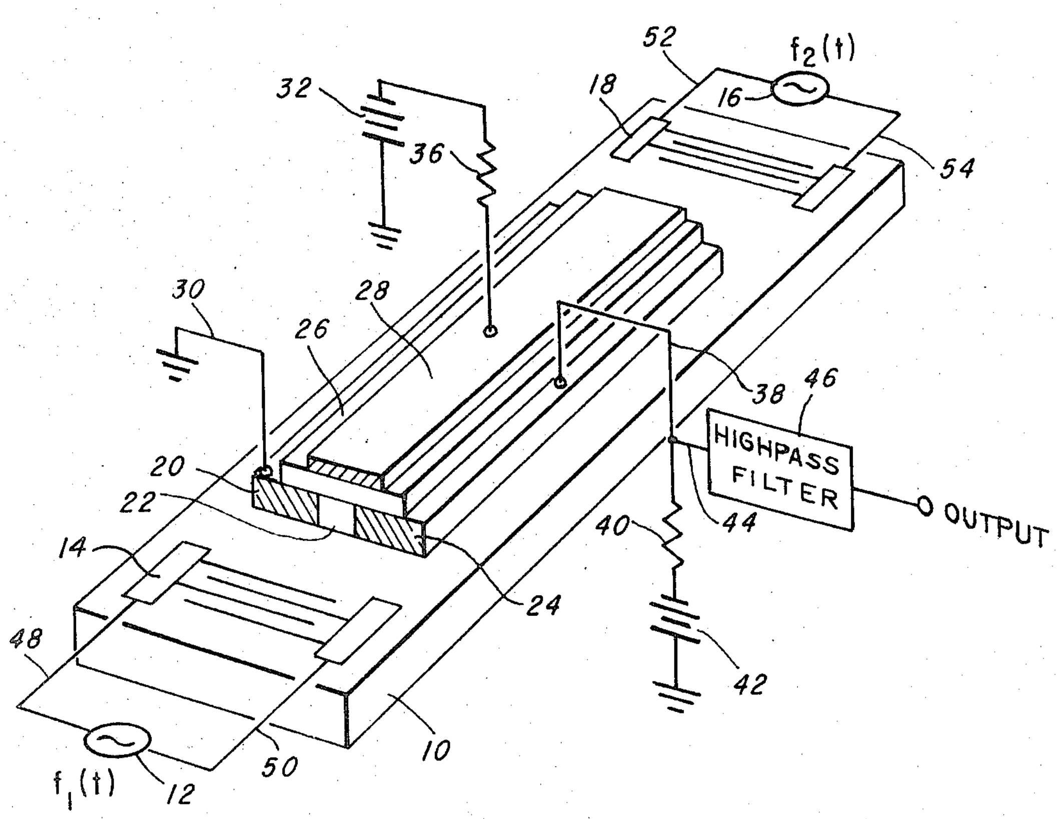

NON-LINEAR SIGNAL PROCESSING DEVICE USING SQUARE LAW DETECTION OF SURFACE ELASTIC WAVES WITH INSULATED GATE FIELD EFFECT TRANSISTOR

This invention relates to surface wave delay lines and in particular to a structure and method for the non-linear mixing of signals employing a surface wave delay line.

The generic phrase "non-linear mixing of signals" as used herein includes but is not limited to the operations of correlation and acoustic convolution. The invention disclosed is applicable to each operation within this class. It will be convenient to describe the invention with reference to the operation of acoustic convolution.

Recently there have been developed methods for accomplishing the acoustic convolution of two wave forms which are propagating as surface waves on a substrate. Acoustic convolution is defined by the following integral:

$$h_{12}(t)=\int_{-\infty}^{+\infty} S_1(\tau)S_2(2t-\tau)d\tau \quad (1)$$

Where $S_1(t)$ and $S_2(t)$ are two arbitrary waveforms and $h_{12}(t)$ is the acoustic convolution. The term acoustic convolution is employed here to distinguish this operation from the well-known mathematical convolution. Note in particular that in the definition of the acoustic convolution the independent parameter $t$ has associated with it a multiplicative factor 2, this multiplicative factor being 1 in the case of the ordinary convolution. The reason for this difference will become clear in the following discussion.

A common prior approach for accomplishing the acoustic convolution involves the use of a bar of non-linear acoustic material such as lithium niobate. Means are provided for launching bulk acoustic waves from both ends of the bar, these two acoustic waves being representative of the wave forms which are to be convolved. As the surface waves pass at the center of the bar, the net stress in this region is the sum of the stresses induced by the two passing surface waves. Located transverse to the bar, in the central region, are two electrodes which detect the resultant piezoelectrically induced fields. The non-linear mixing is generated by the second order piezoelectric coefficients of lithium niobate. The desired acoustic convolution is separated from the first order frequency components by a high pass filter. This type of signal processor is inefficient due to the use of a second order piezoelectric effect to generate the non-linearity. The present invention gives rise to more efficient generation of the acoustic convolution.

Briefly, the non-linear convolver disclosed herein makes use of a substrate material suitable for surface elastic wave propagation, it being possible to employ either a piezoelectric or non-piezoelectric substrate. Transducers are provided at both ends of the substrate for the purpose of launching surface waves, the surface waves being caused to propagate in the direction of the opposite transducer. Fabricated on the surface of the substrate and intermediate to the two transducers is a long insulated gate field-effect transistor (IGFET). The IGFET channel region may comprise either a portion of the substrate, in the case of a piezoelectric substrate, or a piezoelectric layer formed on the surface and contiguous with the substrate material. The remainder of the IGFET is a conventional structure. As the acoustic surface waves propagate along the surface of the substrate, their resultant strains are induced in the channel region of the IGFET. When the acoustic surface waves slide by each other, near the center of the substrate, the net strain, induced in the channel region, will be the sum of the strains induced by the two individual surface waves. This gives rise to a piezoelectrically induced voltage proportional to the sum of the strains induced by the passing wave forms. Since the channel current in an IGFET is proportional to the square of the gate to source voltage, it follows that there will result in the IGFET, a channel current which is proportional to the square of the sum of the strains induced by the two passing acoustic surface waves. This square law dependence of channel current on gate-to-source voltage gives rise to a cross product term in the channel current expression, that is, a portion of the channel current is dependent on the product of the strains induced by the two passing acoustic surface waves. This cross product is the integrand of the acoustic convolution expression where the time reversal of the variable of integration $\tau$ results from the fact that the acoustic surface waves are propagating in opposite directions. Finally, the integration implicit in the definition of acoustic convolution results from the fact that the net channel current is the sum of the infinitesimal channel currents induced along the length of the IGFET.

The use of this invention gives rise to more efficient acoustic convolution of the two wave forms than is possible with prior art methods, since the non-linearity of the IGFET surface wave detector is a first order effect.

It is an object of this invention, therefore, to provide a structure and method of accomplishing the non-linear mixing of signals.

It is a further object of this invention to accomplish the non-linear mixing of signals in a manner more efficient than has been possible with prior art methods.

It is another object of this invention to efficiently accomplish the non-linear mixing of signals through the use of an IGFET fabricated on the surface of a surface wave delay line, and taking advantage of the square law dependence of channel current on gate to source voltage.

Other objects and features of this invention will be made obvious of the following detailed description and the drawing, wherein:

The FIGURE shows a structure for performing an acoustic convolution.

With reference to the FIGURE, there is shown in highly diagramatic form a structure for performing acoustic convolution. The structure is formed on a substrate 10 which may be either piezoelectric or non-piezoelectric but must be capable of supporting the propagation of acoustic surface waves. Formed on the surface of the substrate 10 are interdigital transducers 14 and 18 which may typically be comprised of thin films of gold, aluminum or some other conductive material. Transducer 14 is coupled by means of lines 48 and 50 to an external signal source 12 represented in the FIGURE as $f_1(t)$. Similarly, transducer 18 is coupled by means of lines 52 and 54 to external signal source 16 which is represented as $f_2(t)$. The transducers along with their external connection comprise means for launching surface waves representative of the information content of $f_1(t)$ and $f_2(t)$. In general, it is desired that these surface waves propagate only toward the IGFET structure to be discussed subsequently and consequently it may be desirable to provide means at the extremities of the substrate for damping any waves incident thereon.

Formed on the surface of the substrate, and intermediate to transducers 14 and 18, is a thin film of semiconductor material such as cadmium sulfide and represented as three distinct regions, 20, 22, and 24, in the FIGURE. The thin film may initially include a n-type dopant, although alternatively p-type doping could also be utilized. The extremities of the thin film, represented by designators 20 and 24 in the FIGURE, are subsequently converted to $p+$ doping. Under these circumstances, the film constitutes three distinct regions; a $p+$ doped region, 20, which functions as the source of an IGFET; an n-doped region, 22, which functions as the channel; and a second $p+$ doped region, 24, which functions as the drain of the IGFET. Located on the surface of this thin film is a thin film insulating layer, 26, of a material such as zinc oxide. Located on the surface of the zinc oxide insulating layer, 26, is a thin film of conductive material, 28, comprising the gate electrode of the IGFET.

Thus it is seen that there is located on the surface of substrate 10 an IGFET comprised of source 20, channel 22, drain 24, and gate 28. Strains associated with surface waves propagating along the surface of substrate 10 are coupled to thin film channel region 22, which is in intimate mechanical contact with the substrate. As a result of the piezoelectric nature of the cadmium sulfide, the zinc oxide or the substrate, there will be induced in channel region 22, piezoelectric voltages associated with the propagating strains. In the event that substrate 10 is comprised of a piezoelectric material, it may be desirable in the alternative to form the source 20, channel 22, and drain 24, directly in the substrate material. In either case, the thicknesses of the various thin film regions comprising the IGFET are a sufficiently small proportion of the wave length of acoustic surface waves that negligible distortion of the propagating surface waves results from the presence of the IGFET.

The source 20 is coupled by means of an ohmic contact and line 30 to an external reference, shown as ground in the FIGURE. Similarly, the gate electrode 28 is coupled by means of resistor 36 to an external bias supply shown as battery 32. The drain 24 is coupled by means of an ohmic contact and line 38 to load resistor 40 and an external bias supply shown as battery 42. The drain 24 is also coupled by line 38 and line 44 to a high pass filter 46 the output of which is the acoustic convolution. Methods for fabricating the disclosed structure are well known in the art and need not be discussed in detail here.

For the purpose of illustrating the operation of the structure, it will be assumed that transducers 14 and 18 are equidistant from the nearest ends respectively of the IGFET. Let the surface waves, launched by transducers 14 and 18 in accordance with external signals $f_1(t)$ and $f_2(t)$, be represented by $S_1(t)$ and $S_2(t)$ respectively. It will be assumed that the total length of either of these surface waves is no greater than one-half the length of the IGFET structure. Moreover, for purposes of illustration, let it be assumed that the leading edge of these two surface waves are launched simultaneously by transducers 14 and 18.

Once the surface waves have propagated into the region underlying the IGFET, the effective gate-to-source voltage at any location along the length of the IGFET will be comprised of two components, a dc component designated as $V_{dc}$ and stemming from the external bias supply, and the second component resulting from strain induced piezoelectric polarization of the channel or gate charge. Since the strain induced polarizations of the channel charge will vary as a function of distance along the length of the channel, it is necessary to consider the variation of the gate-to-source voltage as a function of distance along the channel length. It is convenient for this purpose to express the various voltages and strains both as functions of time and of distance along the channel length with the distance origin established at the left end of the channel, that is the end of the IGFET nearest transducer 14. It is also convenient to adopt, as the origin of the time coordinate, that instant when the surface waves first enter the region underlying the IGFET. With these conventions, the net gate-to-source voltage at any time and at any point along the IGFET may be expressed as follows:

$$V_g(t,x) = V_{dc} + a[S_1(t,x) + S_2(t,x)] \tag{2}$$

Where $t$ is the time coordinate, $x$ is the distance coordinate along the length of the IGFET, and where a is the induced voltage per unit of strain in the channel. As is well known in the art, the channel current is a quadratic function of the difference between the gate-to-source voltage and the threshold voltage of the device. Thus, it is possible to express the channel current as a function of time and distance as follows:

$$I_c(t,x) = B/2[V_g(t,x) - V_T]^2 \tag{3}$$

Where $B$ is the gain term and $V_T$ is the threshold voltage of the IGFET. From an inspection of the FIGURE, and the fact that this channel current is also the drain current of the IGFET, it follows that the voltage at the drain 24 of the IGFET will be directly proportional to $I_c$. The cutoff frequency of high pass filter 46 is selected so as to pass only signals having a frequency content higher than that of either $f_1(t)$ or $f_2(t)$. Thus it is clear that both the constant term in (3) $V_T^2$ and the term linear in $V_g$ will be rejected by the highpass filter 46. It is necessary, therefore, to only consider the quadratic term of (3).

Considering only this quadratic term and combining (2) and (3), the relevant portion of $I_c$ can be expressed as:

$$I_c(t,x) = B/2\,\{V_{dc}^2 + a^2S_1^2(t,x) + a^2S_2^2(t,x) + 2aV_{dc}[S_1(t,x) + S_2(t,x)] + 2a^2S_1(t,x)\,S_2(t,x)\} \tag{4}$$

In (4), it is again clear that both the constant term $V_{dc}^2$ and the term linear in $S_1$ and $S_2$ will be rejected by the high pass filter 46. Thus the relevant portion of the expression for $I_c$ can be further reduced to:

$$I_c(t, x)=\frac{B}{2}\{a^2S_1^2(t, x)+a^2S_2^2(t, x)+2a^2S_1(t, x)S_2(t, x)\} \quad (5)$$

To this point, the channel current $I_c$ has been expressed both as a function of time and of distance along the channel length. The total current flowing from the drain of the IGFET is the summation of all the incremental channel currents along the length of the device. This physical summation can be expressed mathematically as an integration with respect to the spacial variable $x$. Since mathematically integration here is only proportional to physical summation, the following relations will be expressed as proportionalities rather than equivalencies. The proper range of integration is from $x = 0$ to the length of the IGFET; that is $x = X$. Under the assumption above, however, it is possible to realize correlation between the two propagating surface waves only when the surface waves are both wholly under the region defined by the IGFET. Therefore, only those times for which this condition is met are of interest. For these times, both $S_1(t,x)$ and $S_2(t,x)$ will have a value of 0 for $x$ less than 0 or greater than $x$. It is clear, therefore, that the range of integration may validly be taken from minus infinity to plus infinity. Then the channel current as a function of time is expressed by the following integral:

$$I_c(t)\propto\int_{-\infty}^{+\infty}\{S_1^2(t, x)+S_2^2(t, x)+2S_1(t, x)S_2(t, x)\}dx \quad (6)$$

For times during which both surface waves are wholly under the region defined by the IGFET, evaluation of the terms of this integral, which are quadratic in $S_1$ and $S_2$, leads to a result which is independent of time. That is, these terms give rise to a dc component which again is suppressed by the action of the high pass filter 46. Therefore, the only portion of the integrand which has relevance is the cross product term between $S_1$ and $S_2$ and the relevant portion of the expression may be reduced to:

$$I_c(t)\propto\int_{-\infty}^{+\infty}S_1\left(t-\frac{x}{V}\right)S_2\left(t+\frac{x}{V}-\frac{X}{V}\right)dx \quad (7)$$

Where $V$ is the velocity of surface wave propagation in the substrate. In (7) the actual dependence of $S_1$ and $S_2$ on $t$ and $x$ has been inserted. With a change of variables given by $t - x/V = \tau$, (7) becomes:

$$I_c(t)\propto\int_{-\infty}^{+\infty}S_1(\tau)S_2\left(2t-\tau-\frac{X}{V}\right)d\tau \quad (8)$$

Finally, if the expression for channel current $I_c$ is evaluated at time $t + X/2V$ rather than at time $t$, the expression becomes:

$$I_c\left(t+\frac{X}{2V}\right)\propto\int_{-\infty}^{+\infty}S_1(\tau)S_2(2t-\tau)\,d\tau \quad (9)$$

This expression is of course in the form of the acoustic convolution. Since the channel current flows in load resistor 40 thereby giving rise to the output voltage of the IGFET, and since it has been shown previously that all other components of the channel current give rise to output voltages which are rejected by high pass filter 46, it follows that if the signal corresponding to the integral of (9) is passed by the high pass filter, then the output of the filter is indeed the acoustic convolution. If the Fourier transform of the acoustic convolution in (9) is taken, it is seen that this Fourier transform is proportional to the products of the Fourier transform of $S_1$ and $S_2$ but wherein both the Fourier transforms of $S_1$ and $S_2$ are shifted upward in frequency by a factor of 2. Therefore, assuming that $S_1$ and $S_2$ do not have widely divergent frequency contents, it will be possible to select a cutoff frequency for the high pass filter of 46 so as to reject the frequency content of $S_1$ and $S_2$ but retain the frequency content of the acoustic convolution of (9).

There has been disclosed a structure for accomplishing the acoustic convolution comprising a substrate capable of supporting the propagation of surface waves, transducers for converting the external electrical signals to be convolved to propagating acoustic surface waves and an IGFET structure for mixing the acoustic surface waves in accordance with its square law channel current characteristics so as to produce the acoustic convolution. Use of the invention is not, however, restricted to the operation of acoustic convolution. With minor modifications the structure disclosed can be adapted to the performance of correlation and other non-linear mixing operations well known to those skilled in the art.

What is claimed is:

1. A system for the non-linear mixing of acoustic waves comprising:

a. a substrate, b. means for launching said acoustic waves in said substrate, so that said acoustic waves propagate through a defined region of said substrate simultaneously, and c. an IGFET formed at the surface of said substrate so that at each point along the channel of said IGFET, a component of the incremental channel current is proportional to the square of the sum of the strains induced by said acoustic waves in said substrate and the total channel current of said IGFET is the sum of said incremental channel currents.

2. A system for performing the acoustic convolution of two signals comprising:

a. a substrate capable of supporting the propagation of acoustic surface waves, b. interdigital transducers located on the surface of said substrate for launching acoustic surface waves representative of said signals, said acoustic surface waves being caused to propagate in opposite directions and to pass in a defined region intermediate to said interdigital transducers, and c. an IGFET located at the surface of said substrate and intermediate to said interdigital transducers such that strains in said defined region are coupled to the channel region of said IGFET, and at each point in said channel region a component of the incremental channel current is proportional to the square of the sum of the strains induced by said acoustic surface waves at said point and wherein the total channel current of said IGFET is the sum of said incremental channel currents.

3. A method of performing the acoustic convolution of two signals including the steps of:

a. launching contra-directed acoustic surface waves representative of said two signals on a surface wave delay line, such that said acoustic surface waves propagate simultaneously through the channel of an IGFET formed at the surface of said surface wave delay line, b. developing a voltage proportional to the drain current of said IGFET, and c. filtering said voltage so as to extract the component of said voltage representative of said acoustic convolution.

4. A system for the non-linear mixing of acoustic surface waves comprising:

a. a substrate, b. means for launching acoustic surface waves from opposite ends of said substrate in said substrate so that said acoustic surface waves propagate through an intermediate region of said substrate simultaneously in opposite directions, c. a semiconductor film of piezoelectric material disposed on said substrate and overlying said intermediate region thereof, said semiconductor film having a plurality of distinct regions extending lengthwise thereof in line with the propagation directions to be assumed by said acoustic surface waves, said plurality of distinct regions including a pair of spaced apart outer regions of one conductivity type and a channel region of the other conductivity type interposed between said pair of outer regions and connecting said pair of outer regions, d. an insulating layer overlying said semiconductor film and covering said channel region thereof, and e. a gate electrode disposed on said insulating layer, f. said semiconductor film, said insulating layer, and said gate electrode cooperating to define an IGFET structure wherein said pair of outer regions comprise the source and drain regions and said channel region is coextensive with said intermediate region of said substrate, and g. said IGFET structure being responsive to the simultaneous propagation of acoustic surface waves in said substrate in opposite directions such that at each point along said channel region an incremental channel current is produced having a component proportional to the square of the sum of the strains induced by said acoustic surface waves at said point to provide a total channel current for said IGFET structure which is the sum of said incremental channel currents.

* * * * *